(12) United States Patent
Lecue et al.

(10) Patent No.: US 11,526,849 B2
(45) Date of Patent: Dec. 13, 2022

(54) DATA SET FILTERING FOR MACHINE LEARNING

(71) Applicant: Accenture Global Solutions Limited, Dublin (IE)

(72) Inventors: Freddy Lecue, Castleknock (IE); Mykhaylo Zayats, Dublin (IE); Benedikt Maximilian Johannes Golla, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 922 days.

(21) Appl. No.: 16/376,675

(22) Filed: Apr. 5, 2019

(65) Prior Publication Data
US 2020/0320482 A1    Oct. 8, 2020

(51) Int. Cl.
| | |
|---|---|
| *G06Q 10/10* | (2012.01) |
| *G06F 40/30* | (2020.01) |
| *G06F 17/16* | (2006.01) |
| *G06Q 10/06* | (2012.01) |
| *G06K 9/62* | (2022.01) |
| *G06F 17/18* | (2006.01) |
| *G06N 20/00* | (2019.01) |

(52) U.S. Cl.
CPC ......... *G06Q 10/1053* (2013.01); *G06F 17/16* (2013.01); *G06F 17/18* (2013.01); *G06F 40/30* (2020.01); *G06K 9/6215* (2013.01); *G06K 9/6298* (2013.01); *G06N 20/00* (2019.01); *G06Q 10/06311* (2013.01); *G06K 9/6232* (2013.01)

(58) Field of Classification Search
CPC .......... G06Q 10/1053; G06Q 10/06311; G06F 40/30; G06F 17/16
USPC ......................................................... 706/21
See application file for complete search history.

(56) References Cited

U.S. PATENT DOCUMENTS

2019/0114593 A1* 4/2019 Champaneria ...... G06F 16/3326

\* cited by examiner

*Primary Examiner* — Jeffery A Williams
(74) *Attorney, Agent, or Firm* — Harrity & Harrity, LLP

(57) ABSTRACT

A device may determine an association between a second set of parameters and a third set of parameters using a pseudo-inversion network and a multiple regression procedure. The device may determine semantic embeddings based on a set of semantic descriptions of the second set of parameters. The device may determine a semantic similarity between parameters of the second set of parameters based on the semantic embeddings. The device may determine a consistency error based on the semantic similarity. The device may generate, using a regression-based learning model technique, a matrix representing an association between the second set of parameters and the third set of parameters based on the association and the consistency error. The device may perform an action based on the matrix.

20 Claims, 10 Drawing Sheets

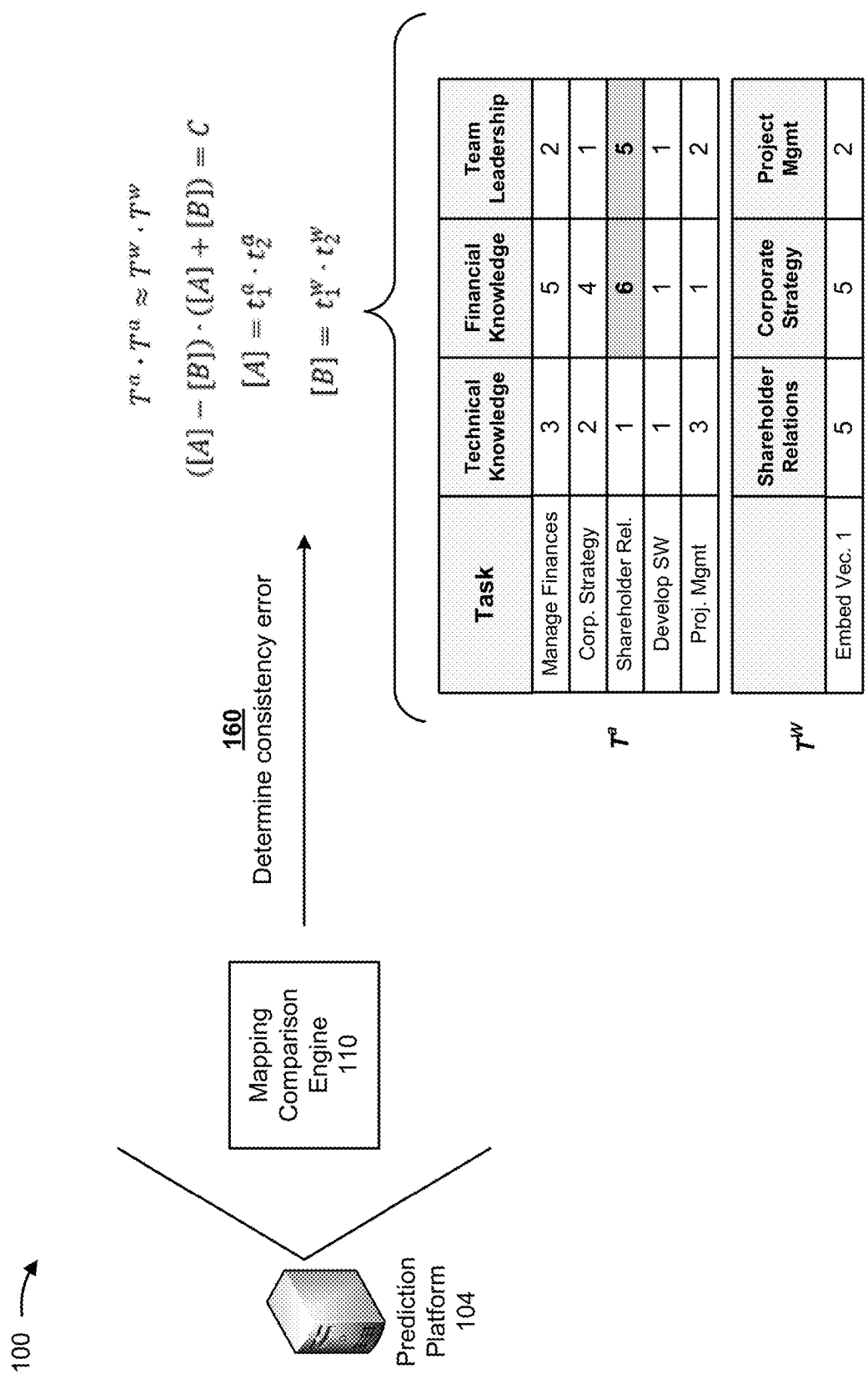

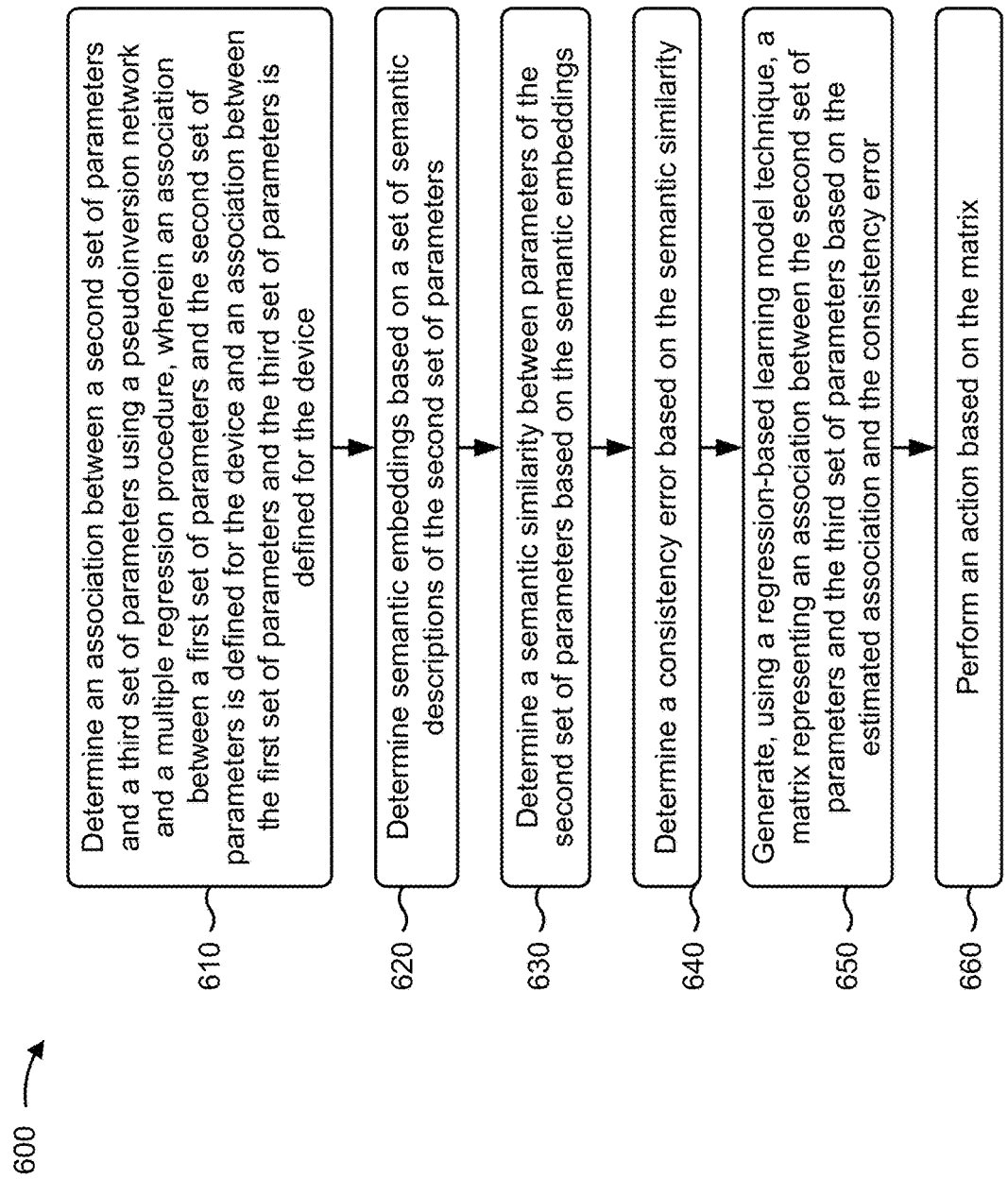

DATA SET FILTERING FOR MACHINE LEARNING

BACKGROUND

A data structure may represent types, properties, and interrelationships between entities. The fields of artificial intelligence, systems engineering, software engineering, biomedical informatics, library science, enterprise bookmarking, resource management, task assignment, and/or the like create data structures to represent complex organizational information. For example, in a task assignment field, a matrix may be used to represent a relationship between tasks to which an employee may be assigned and roles of employees that may be assigned to complete the tasks. Similarly, a matrix may be used to represent a relationship between roles to which an employee may be assigned and attributes that are determined to be of importance to each role, such as traits, skills, certifications, experiences, and/or the like that may correlate with high performance in a particular role. In these cases, values of the matrices may represent relative strengths of relationships that the matrices are to represent. For example, values may represent a strength of an association between a role and an attribute (e.g., an importance of an attribute to a corresponding role).

SUMMARY

According to some possible implementations, a device may include memory and one or more processors operatively coupled to the memory. The memory and the one or more processors may be configured to one or more memories; and one or more processors, communicatively coupled to the one or more memories, to: receive a first matrix and a second matrix, wherein the first matrix represents an association between a first set of parameters and a second set of parameters and the second matrix represents an association between the first set of parameters and a third set of parameters; estimate an association between the second set of parameters and the third set of parameters using a pseudoinversion network and a multiple regression procedure; receive a set of semantic descriptions of the second set of parameters; generate a semantic embeddings matrix based on the set of semantic descriptions of the second set of parameters; determine a semantic similarity between parameters of the second set of parameters based on the semantic embeddings matrix; determine a consistency error based on the semantic similarity; generate, using a regression-based learning model technique, a third matrix representing an association between the second set of parameters and the third set of parameters based on the association and the consistency error; and perform an action based on the third matrix.

According to some possible implementations, a method may include receiving, by a device, a first matrix and a second matrix, wherein the first matrix represents an association between a first set of parameters and a second set of parameters and the second matrix represents an association between the first set of parameters and a third set of parameters; determining, by the device, an association between the second set of parameters and the third set of parameters using a pseudoinversion network and a multiple regression procedure; generating, by the device, a semantic embeddings matrix based on a set of semantic descriptions of the second set of parameters; determining, by the device, a semantic similarity between parameters of the second set of parameters based on the semantic embeddings matrix; determining, by the device, a consistency error based on the semantic similarity; generating, by the device and using a regression-based learning model technique, a third matrix representing an association between the second set of parameters and the third set of parameters based on the association and the consistency error; and performing, by the device, an action based on the third matrix.

According to some possible implementations, a non-transitory computer-readable medium may store one or more instructions. The one or more instructions, when executed by one or more processors of a device, may cause the one or more processors to: determine an association between a second set of parameters and a third set of parameters using a pseudoinversion network and a multiple regression procedure, wherein an association between a first set of parameters and the second set of parameters is defined for the device and an association between the first set of parameters and the third set of parameters is defined for the device; determine semantic embeddings based on a set of semantic descriptions of the second set of parameters; determine a semantic similarity between parameters of the second set of parameters based on the semantic embeddings; determine a consistency error based on the semantic similarity; generate, using a regression-based learning model technique, a matrix representing an association between the second set of parameters and the third set of parameters based on the association and the consistency error; and perform an action based on the matrix.

BRIEF DESCRIPTION OF THE DRAWINGS

FIGS. 1A-1E are diagrams of an example implementation described herein.

FIG. 6 is a flow chart of an example process for relationship mapping.

DETAILED DESCRIPTION

The following detailed description of example implementations refers to the accompanying drawings. The same reference numbers in different drawings may identify the same or similar elements.

A matrix may be well-suited to modeling relations between entities. In machine learning, such matrices may be used as input for performing a prediction relating to entities representing rows and columns (and/or other dimensions) of the matrix. For example, a first matrix may be used to represent first relationships of a first entity to a second entity and a second matrix may be used to represent second relationships of the first entity to a third entity. In this case, values of the first matrix represent a strength of the first relationships and values of the second matrix represent a strength of the second relationships.

However, a in some cases, a prediction is to be performed based on a relationship for which relative strengths are not defined and/or for which data is missing. For example, when a prediction is to be performed based on a relationship, some prediction techniques may be inaccurate because of a lack of mapping of parameters upon which the prediction is to be performed or because an existing mapping is in accurate. As a result, prediction models may be inaccurate and use of inaccurate prediction models may result in excessive wastes of computing and memory resources, especially when data upon which predictions are based represent relationships between hundreds, thousands, or millions of parameters.

Some implementations described herein provide a prediction platform that enables accurate relationship mapping for data structures representing parameter relationships, and enables predictions based on performing an accurate relationship mapping. In this way, the prediction platform may enable, for example, a matrix representing a set of relationships to be used for subsequent predictions relating to the set of relationships. For example, the prediction platform may receive a first matrix that is generated to represent a first set of relationships between first parameters and second parameters and a second matrix that is generated to represent a second set of relationships between the first parameters and third parameters, the prediction platform may estimate a third set of relationships between the second parameters and the third parameters, the prediction platform may determine a consistency error associated with the third set of relationships based on natural language processing, and the prediction platform may generate a model to determine a third matrix representing the third set of relationships based on the consistency error. In this way, the prediction platform enables completion of the third matrix, which may enable more accurate determinations by a system that uses the third matrix to make determinations, such as more accurate determinations relating to task assignment, employee management, and/or the like.

Figure 1A:
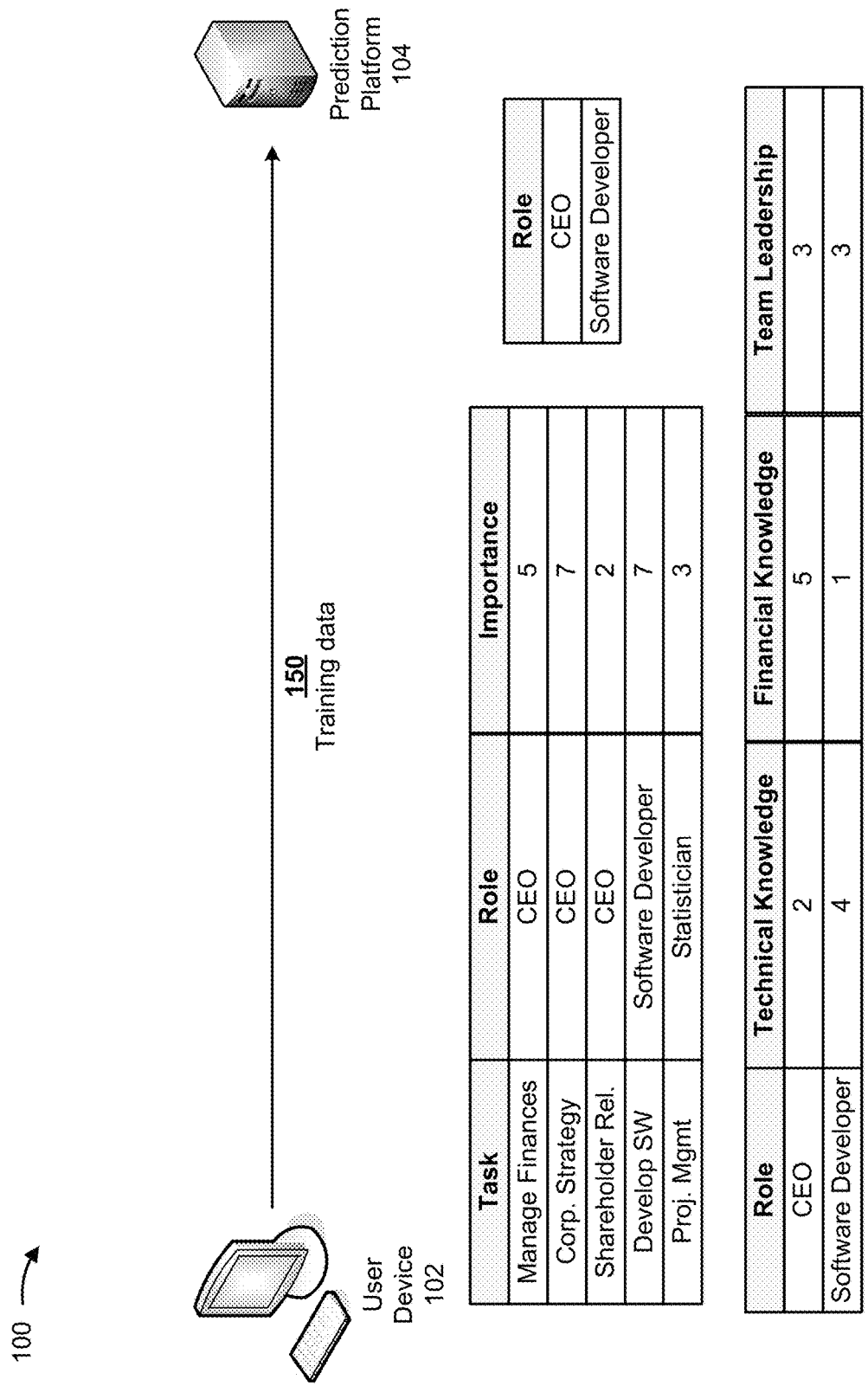

FIGS. 1A-1E are diagrams of an example implementation 100 described herein. As shown in FIG. 1A, user device 102 may be associated with a prediction platform 104.

As further shown in FIG. 1A, and by reference number 150, a user of user device 102 (e.g., via a user interface provided to the user) may cause user device 102 to provide, to prediction platform 104, data for generating a first matrix representing relationships between workforce roles (termed roles) and workforce tasks (termed tasks). Such relationships may be represented by values of the matrix that may be weighted based on a strength of a relationship. Further, the training data may include data for generating a second matrix associated with representing relationships between the roles and workforce attributes (termed attributes).

In some implementations, a role may refer to a position to which an employee may be assigned. For example, roles may include a software developer role, a project manager role, a human resources role, and/or the like. In some implementations, a task may be an activity that is completed as part of a role. For example, tasks may include a code review task (e.g., which may include subtasks, such as requirements review, code editing, report completion, etc.), a code authoring task (e.g., which may include subtasks, such as generating documentation, testing, etc.), and/or the like. In some implementations, an attribute may be a characteristic associated with completion of a task of a role and/or performance of the role thereof. For example, attributes may include an importance of a task, an activity associated with the task, a work context of a task, and/or the like. As an example, an attribute may include whether a task is client-facing or non-client facing, repetitive or non-repetitive, and/or the like. Further, attributes may include characteristics that correlate to a threshold level of performance in a task or role. In this case, the correlation may be determined based on analysis of data relating to previous performance in the task or role. For example, for a particular role, characteristics associated with a threshold level of performance may include a leadership characteristic, a creativity characteristic, a technical ability characteristic, an educational characteristic, a certification characteristic, and/or the like. As an example, prediction platform 104 may access a database storing information, and may obtain information identifying a role (e.g., 'CEO'), a task (e.g., 'manage finances'), an importance of the task to the role (e.g., 'high' or a numerical value '5'), and/or the like. Similarly, prediction platform 104 may access a database identifying roles of an organization, a relationship between roles and attributes (e.g., a strength of a relationship between a 'CEO' role and a 'Financial Knowledge' skill—'5'), and/or the like. In this case, prediction platform 104 may parse the information to determine tasks, roles, activities, attributes, and/or the like based on the information, such as using natural language processing and/or machine learning as described in more detail herein.

In some implementations, prediction platform 104 may automatically obtain the data. For example, prediction platform 104 may obtain role data, which may identify a set of roles for an employee, a set of tasks associated with the set of roles, a set of attributes associated with the set of tasks or the set of roles, and/or the like. In some implementations, prediction platform 104 may obtain a natural language description of roles, tasks, and/or activities when obtaining training data. For example, prediction platform 104 may obtain an employee handbook, a textual description provided by an employee, a requirements document pertaining to a task, a job description, and/or the like, and may use a natural language processing technique to determine roles, tasks, and/or activities identified by the natural language description.

Additionally, or alternatively, prediction platform 104 may obtain employee characteristic data, which may identify one or more skills of an employee, a level of experience of an employee, a set of employee evaluations performed by a manager of the employee, a set of employee preferences, and/or the like. In some implementations, prediction platform 104 may obtain employee characteristic data relating to a set of employees with a common skill, a common level of experience, a common work location, a common role, a common task, a common activity, a common salary, and/or the like. In this case, prediction platform 104 may obtain data relating to a set of similar employees for use in determining a prediction or a recommendation relating to a similar employee, thereby improving an accuracy of a prediction.

In some implementations, prediction platform 104 may obtain organization data associated with an employer. For example, prediction platform 104 may obtain data identifying an industry of the organization; roles, tasks, and/or activities of the organization; automation capabilities of the organization; and/or the like. In some implementations, prediction platform 104 may obtain organization data associated with one or more other organizations. For example, prediction platform 104 may identify one or more similar organizations to the organization, such as based on a common industry, a common set of roles, a common location, and/or the like, and may obtain data regarding the one or more similar organizations. In some implementations, prediction platform 104 may process the data. For example, prediction platform 104 may process the data to identify a set of attributes defining activities associated with tasks, a set of tasks inferred based on the data, and/or the like.

Although some implementations, described herein, relate to task assignment and workforce management domains, the prediction platform may be used with any type of domain and may be domain agnostic.

Figure 1B:
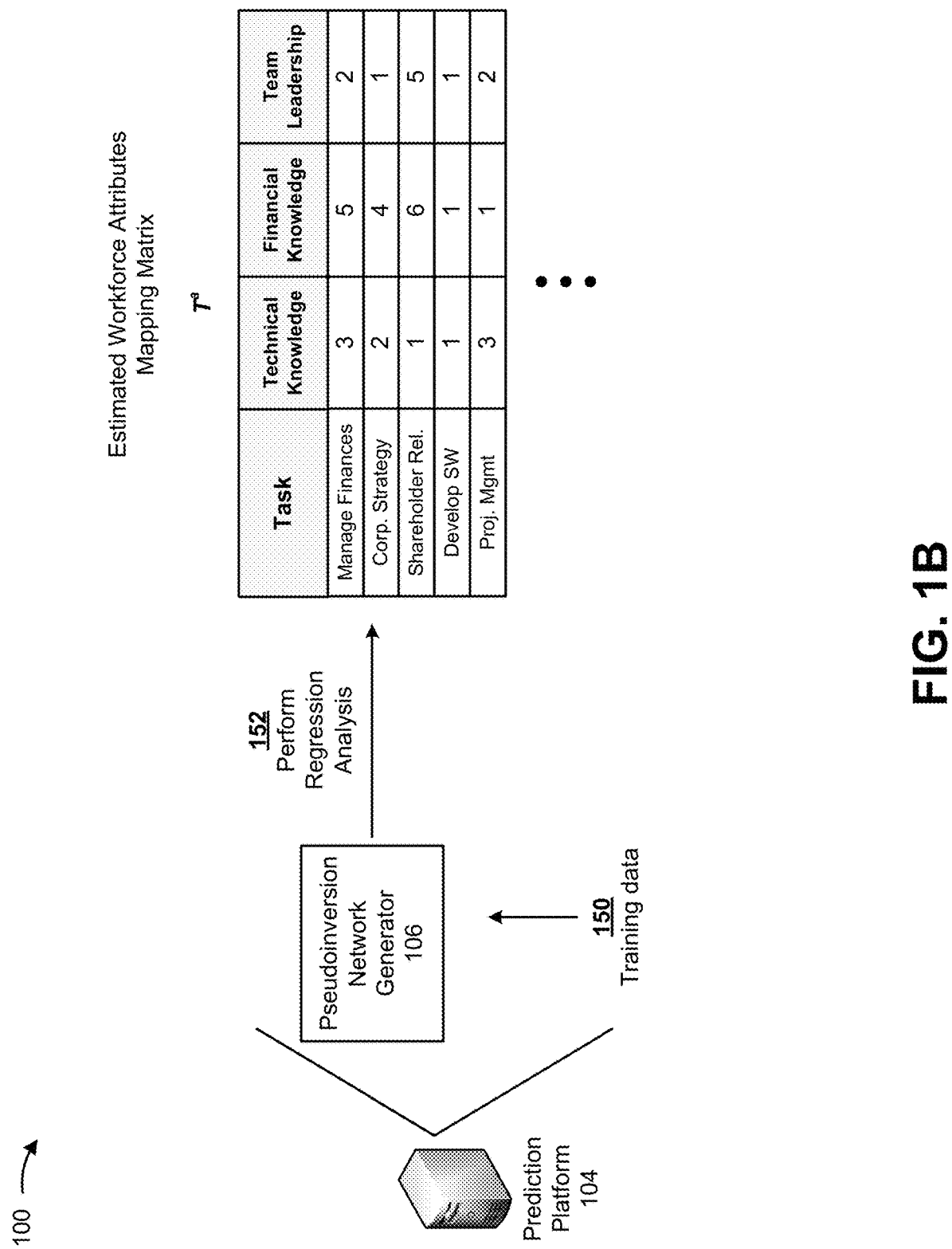

As shown in FIG. 1B, and by reference number 152, prediction platform 104, using pseudoinversion network generator 106, may generate an estimated workforce attributes mapping matrix $T^a$ that represents an estimate of a task to attribute mapping. For example, prediction platform 104 may approximate an equality between a role to task mapping for the first matrix and a task to attribute mapping that is to be determined using a pseudoinversion network, which may be a type of neural network. In this case, prediction platform 104 may perform multiple regression analyses of roles defined by tasks to determine roles defined by attributes. In some implementations, prediction platform 104 may perform pseudoinversion network prediction over an identity matrix representing roles corresponding to single tasks. In some implementations, prediction platform 104 may use the first matrix as an input and the second matrix as an output to determine an estimate of a third matrix represent the task to attribute mapping. For example, prediction platform 104 may use the first matrix as an input layer to the pseudoinversion network and the second matrix as an output layer from the pseudoinversion network. In this case, the third matrix may be represented by internal parameters and structure of the pseudoinversion network, which may be determined by prediction platform 104 based on the first matrix and the second matrix. In some implementations, the matrices may represent non-linear mappings.

Figure 1C:
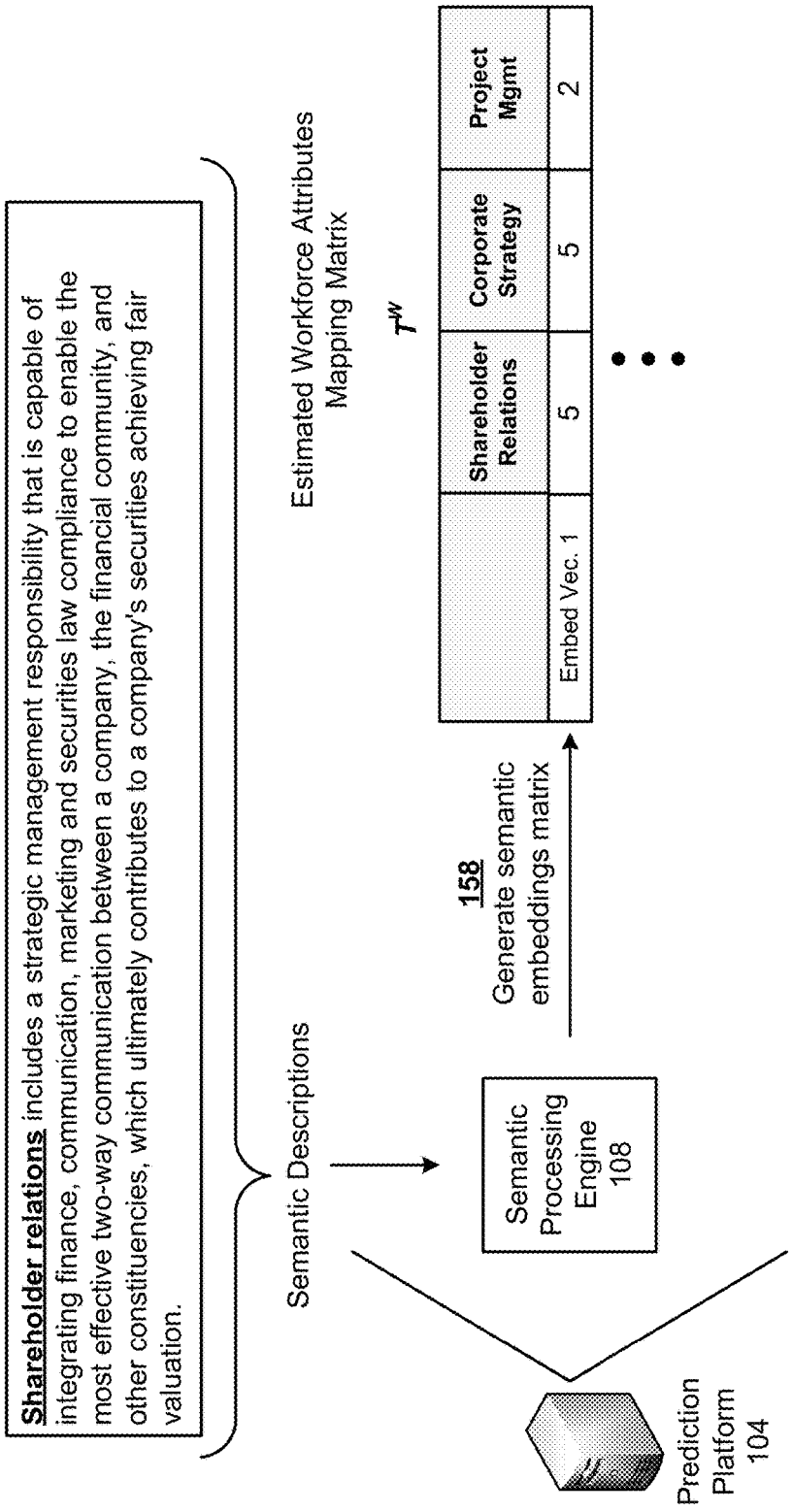

As shown in FIG. 1C, and by reference number 158, prediction platform 104, using semantic processing engine 108, may generate a semantic embeddings matrix $T^w$ representing the content of each individual task. In this case, rows of the semantic embeddings matrix may represent embedding vectors for each task determined based on the natural language descriptions. In some implementations, prediction platform 104 may use a particular natural language processing technique for determining word embeddings, as described in more detail above.

As shown in FIG. 1D, and by reference number 160, prediction platform 104, using mapping comparison engine 110, may determine a consistency error for the estimated third matrix based on the semantic embeddings matrix. For example, based on an assumption that semantically similar tasks are to be associated with similar attribute sets, prediction platform 104 may determine the consistency error, which may be calculated based on a set of equations:

$$T^a \cdot T^a \approx T^w \cdot T^w$$

$$([A]-[B]) \cdot ([A]+[B]) = C$$

$$[A] = t_1^a \cdot t_2^a$$

$$[B] = t_1^w \cdot t_2^w$$

$$t_1^a \cdot t_2^a \approx t_1^w \cdot t_2^a$$

where A represents an algebraic attribute similarity matrix (e.g., the estimated third matrix), B represents a semantic similarity matrix, t represents a task (e.g., $t_1$: 'shareholder relations', $t_2$: 'corporate strategy'), a represents t in attribute space, w represents t in semantic space, and · represents a scalar product (e.g., a cosine/sine similarity). For example, prediction platform 104 may obtain a natural language description of a 'shareholder relations' task and may determine a semantic similarly between the natural language description of the 'shareholder relations' task and another natural language description of another task. In this case, based on the 'shareholder relations' task having a relatively high semantic similarly to, for example, a 'corporate strategy' task, prediction platform 104 may determine that the 'shareholder relations' task is expected to map to similar attributes to the 'corporate strategy' task. Further, prediction platform 104 may determine a finalized error based on the semantic attribute similarity matrix and the error estimate. In some implementations, prediction platform 104 may determine a row-wise normalization to determine the error estimate. For example, based on an output of computing the embedding similarity, mapping comparison engine 110 may perform the row-wise normalization procedure. In this case, prediction platform 104 may determine the finalized error based on a result of the row-wise normalization. In this way, prediction platform 104 may determine a consistency error estimate for each task of a set of tasks associated with the first knowledge graph and/or the second knowledge graph.

Figure 1E:
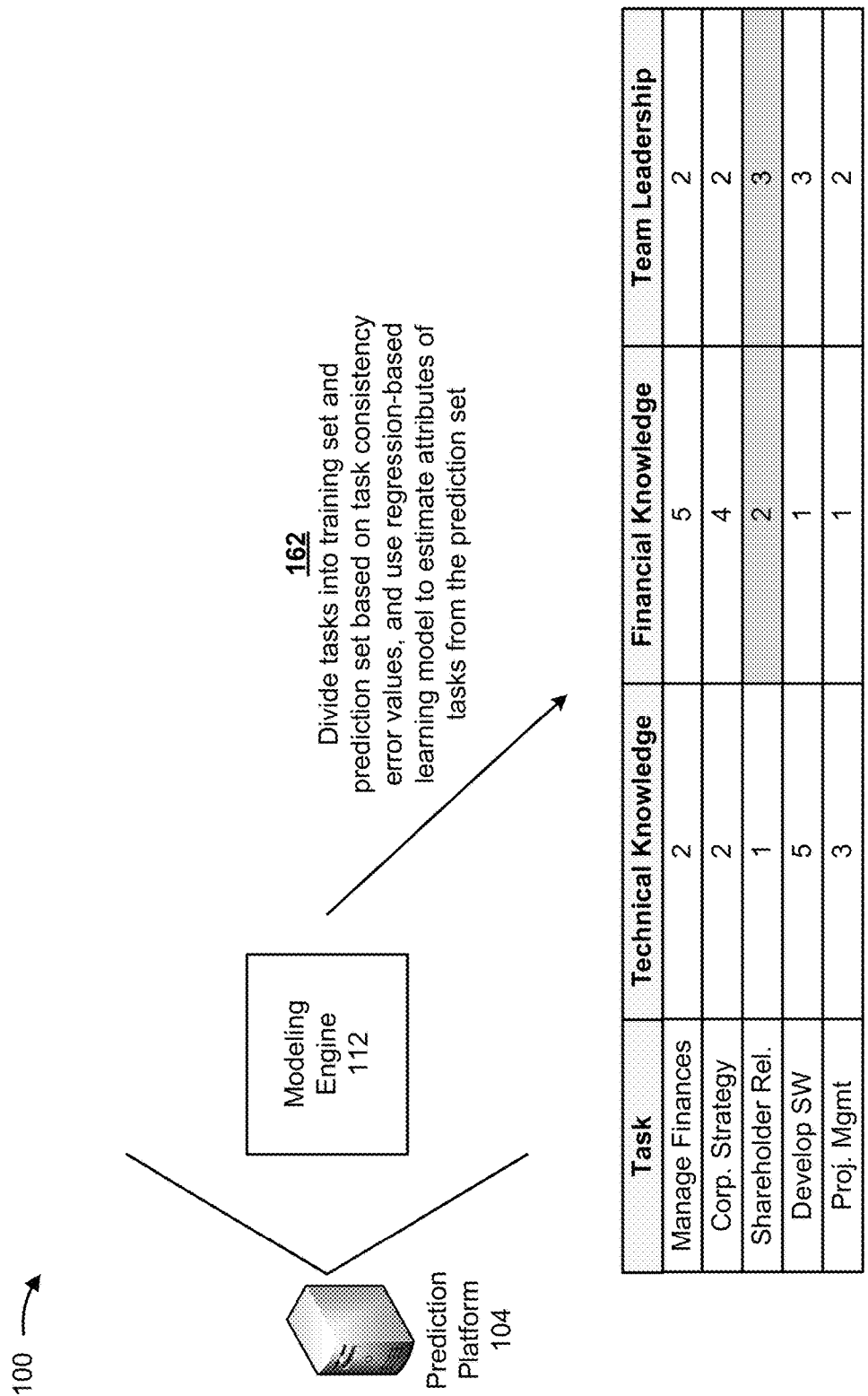

As shown in FIG. 1E, and by reference number 162, using modeling engine 112, prediction platform 104 may determine the third matrix (e.g., a mapping of tasks to attributes) based on the consistency error values. For example, prediction platform 104 may divide tasks into a training set and a prediction set based on task consistency error values, and may use a regression-based learning model to estimate attributes of tasks from the prediction set. In other words, if a task consistency error value is low (e.g., less than a threshold) for a task to attribute mapping, prediction platform 104 assigns the task to attribute mapping to the training set, and if the task consistency error value is high, prediction platform 104 assigns the task to attribute mapping to the prediction set. In this case, prediction platform 104 applies regression-based learning using the training set to complete the prediction set (e.g., to predict strengths of task-attribute relationships). In this way, prediction platform 104 completes an incomplete data set of the third matrix. Further, by decoupling the regression-based learning from other operations (e.g., the pseudo-inversion and semantic similarity), prediction platform 104 enables greater flexibility in algorithm selection than a single-step prediction process, thereby enabling selection of more efficient algorithms for each step of the prediction process, which may reduce a utilization of computing resources relative to techniques that require a single algorithm type for the entire prediction process.

Based on determining the prediction of the attribute for the task, prediction platform 104 may perform an action. For example, prediction platform 104 may provide course recommendations relating to a role based on determining attributes associated with the role. As an example, prediction platform 104 may provide information to identify a set of skills that are recommended for an employee (e.g., an "SAP Security" skill, a "Mobile Architecture" skill, etc.) to enable the employee to be qualified for a role or a task. Additionally, or alternatively, prediction platform 104 may provide information identifying a course schedule for one or more courses automatically selected for the employee corresponding to the set of skills.

In some implementations, prediction platform 104 may automatically obtain a video-based course or an audio-based course, and may provide the course via a user interface. For example, prediction platform 104 may automatically search the web for a course associated with a recommended skill, and may automatically allocate resources for a content delivery network (CDN) to distribute the course to many employees (e.g., thereby reducing a utilization of network resources relative to many employees separately attempting to obtain the course). In this case, prediction platform 104 may generate a user interface in which to provide the course to the many employees (e.g., thereby reducing a utilization of memory resources relative to each employee obtaining a separate audio or video playback application for the course).

In some implementations, prediction platform 104 may schedule a meeting for an employee with a manager of the employee to discuss results, skills, tasks, roles, attributes, and/or the like relating to the employee, and may transmit alerts and/or calendar events relating to the meeting to client devices used by the employee, the manager, and/or the like. In some implementations, prediction platform 104 may provide a chat functionality to discuss tasks, roles, attributes, etc. with other employees.

As indicated above, FIGS. 1A-1E is provided merely as an example. Other examples are possible and may differ from what was described with regard to FIGS. 1A-1E.

Figure 2:
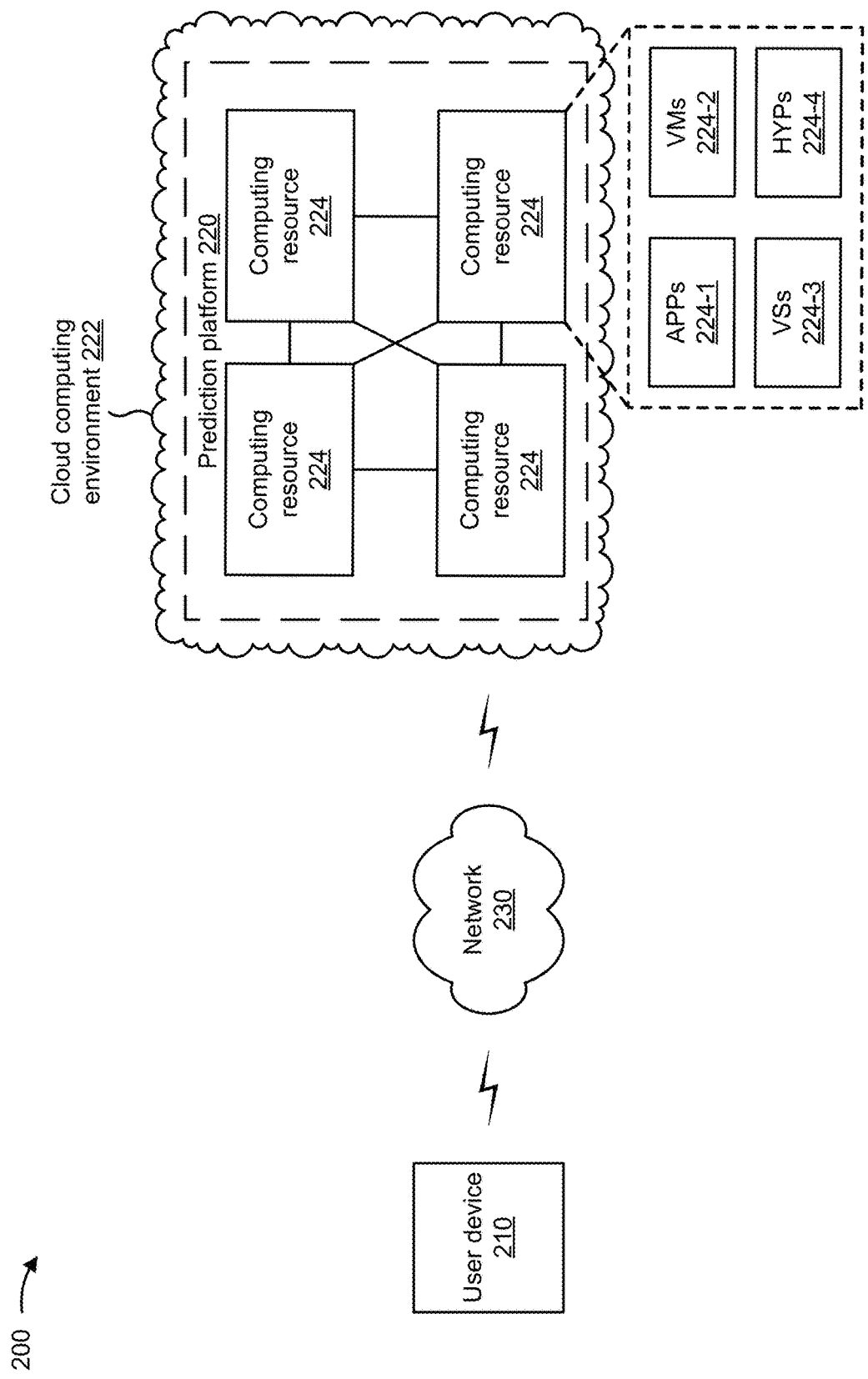
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a prediction platform 220, a cloud computing environment 222, a computing resource 224, and a network 230. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), and/or a similar type of device.

Prediction platform 220 includes one or more computing resources assigned to determine a relationship mapping for entities, perform an action based on completing a relationship mapping for entities, and/or the like, as described herein. For example, prediction platform 220 may be a platform implemented by cloud computing environment 222 that may determine a relationship mapping for entities, perform an action based on completing a relationship mapping for entities, and/or the like. In some implementations, prediction platform 220 is implemented by computing resources 224 of cloud computing environment 222.

Prediction platform 220 may include a server device or a group of server devices. In some implementations, prediction platform 220 may be hosted in cloud computing environment 222. Notably, while implementations described herein describe prediction platform 220 as being hosted in cloud computing environment 222, in some implementations, prediction platform 220 may not be cloud-based or may be partially cloud-based.

Cloud computing environment 222 includes an environment that delivers computing as a service, whereby shared resources, services, etc. may be provided to determine a relationship mapping for entities, perform an action based on completing a relationship mapping for entities, and/or the like. Cloud computing environment 222 may provide computation, software, data access, storage, and/or other services that do not require end-user knowledge of a physical location and configuration of a system and/or a device that delivers the services. As shown, cloud computing environment 222 may include prediction platform 220 and computing resource 224.

Computing resource 224 includes one or more personal computers, workstation computers, server devices, or another type of computation and/or communication device.

In some implementations, computing resource 224 may host prediction platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 may include a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by user device 210. Application 224-1 may eliminate a need to install and execute the software applications on user device 210. For example, application 224-1 may include software associated with prediction platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., user device 210), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 provides hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
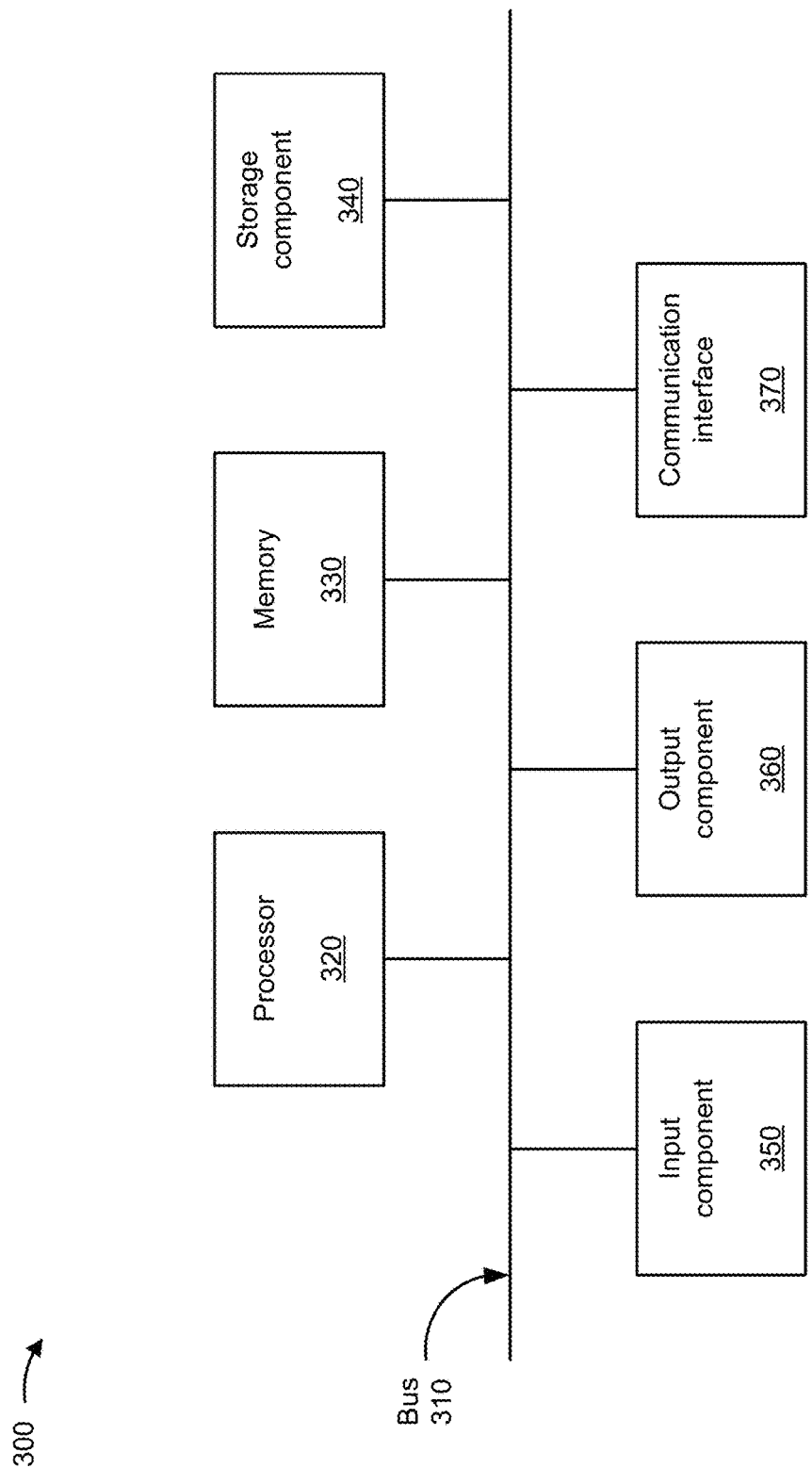
FIG. 3 is a diagram of example components of one or more devices of FIG. 2.

FIG. 3 is a diagram of example components of a device 300. Device 300 may correspond to user device 210, prediction platform 220, and/or computing resource 224. In some implementations, user device 210, prediction platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
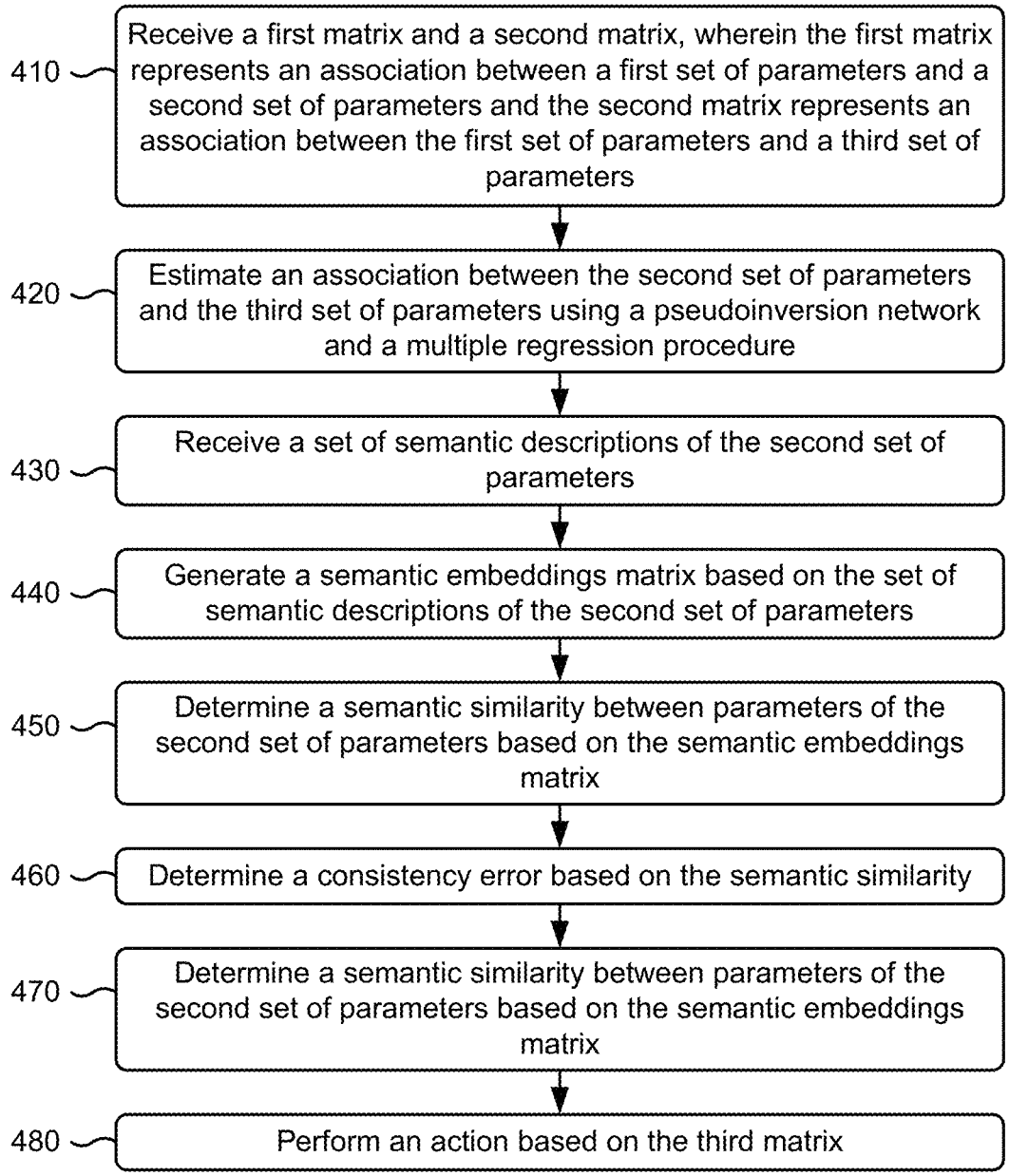
FIG. 4 is a flow chart of an example process for relationship mapping.

FIG. 4 is a flow chart of an example process 400 for relationship mapping. In some implementations, one or more process blocks of FIG. 4 may be performed by a prediction platform (e.g. prediction platform 220). In some implementations, one or more process blocks of FIG. 4 may be performed by another device or a group of devices separate from or including prediction platform (e.g. prediction platform 220), such as a user device (e.g. user device 210) and a computing resource (e.g. computing resource 224).

As shown in FIG. 4, process 400 may include receiving a first matrix and a second matrix wherein the first matrix represents an association between a first set of parameters and a second set of parameters and the second matrix represents an association between the first set of parameters and a third set of parameters (block 410). For example, the prediction platform (e.g., using processor 320, memory 330, storage component 340, input component 350, output component 360, communication interface 370 and/or the like) may receive a first matrix and a second matrix and wherein the first matrix represents an association between a first set of parameters and a second set of parameters and the second matrix represents an association between the first set of parameters and a third set of parameters, as described above. In some implementations, the first matrix represents an association between a first set of parameters and a second set of parameters and the second matrix represents an association between the first set of parameters and a third set of parameters.

As further shown in FIG. 4, process 400 may include estimating an association between the second set of parameters and the third set of parameters using a pseudoinversion network and a multiple regression procedure (block 420). For example, the prediction platform (e.g., using processor 320, memory 330, storage component 340, input component 350, output component 360, communication interface 370 and/or the like) may estimate an association between the second set of parameters and the third set of parameters using a pseudoinversion network and a multiple regression procedure, as described above.

As further shown in FIG. 4, process 400 may include receiving a set of semantic descriptions of the second set of parameters (block 430). For example, the prediction platform (e.g., using processor 320, memory 330, storage component 340, input component 350, output component 360, communication interface 370 and/or the like) may receive a set of semantic descriptions of the second set of parameters, as described above.

As further shown in FIG. 4, process 400 may include generating a semantic embeddings matrix based on the set of semantic descriptions of the second set of parameters (block 440). For example, the prediction platform (e.g., using processor 320, memory 330, storage component 340, input component 350, output component 360, communication interface 370 and/or the like) may generate a semantic embeddings matrix based on the set of semantic descriptions of the second set of parameters, as described above.

As further shown in FIG. 4, process 400 may include determining a semantic similarity between parameters of the second set of parameters based on the semantic embeddings matrix (block 450). For example, the prediction platform (e.g., using processor 320, memory 330, storage component 340, input component 350, output component 360, communication interface 370 and/or the like) may determine a semantic similarity between parameters of the second set of parameters based on the semantic embeddings matrix, as described above.

As further shown in FIG. 4, process 400 may include determining a consistency error based on the semantic similarity (block 460). For example, the prediction platform (e.g., using processor 320, memory 330, storage component 340, input component 350, output component 360, communication interface 370 and/or the like) may determine a consistency error based on the semantic similarity, as described above.

As further shown in FIG. 4, process 400 may include generating, using a regression-based learning model technique, a third matrix representing an association between the second set of parameters and the third set of parameters based on the estimated association and the consistency error (block 470). For example, the prediction platform (e.g., using processor 320, memory 330, storage component 340, input component 350, output component 360, communication interface 370 and/or the like) may generate, using a regression-based learning model technique, a third matrix representing an association between the second set of parameters and the third set of parameters based on the estimated association and the consistency error, as described above.

As further shown in FIG. 4, process 400 may include performing an action based on the third matrix (block 480). For example, the prediction platform (e.g., using processor 320, memory 330, storage component 340, input component 350, output component 360, communication interface 370 and/or the like) may perform an action based on the third matrix, as described above.

Process 400 may include additional implementations, such as any single implementation or any combination of implementations described below and/or in connection with one or more other processes described elsewhere herein.

In some implementations, a semantic similarity between parameters of the third set of parameters corresponds to the semantic similarity between the parameters of the second set of parameters.

In some implementations, the prediction platform may divide estimated parameters of the second set of parameters into a training set and a prediction set based on the consistency error. In some implementations, the prediction platform may generate a regression-based learning model using the regression-based learning model technique and based on the training set and the prediction set. In some implementations, the prediction platform may generate the third matrix using the regression-based learning model.

In some implementations, the prediction platform may determine the association between parameters of the third set of parameters and the parameters of the second set of parameters, which are included in the prediction set, using the regression-based learning model.

In some implementations, the first set of parameters is a set of workforce roles, the second set of parameters is a set of workforce tasks, and the third set of parameters is a set of workforce attributes.

In some implementations, the prediction platform may set the first matrix as an input layer. In some implementations, the prediction platform may set the second matrix as an output layer. In some implementations, the prediction platform may set the third matrix as a set of internal parameters and an internal structure for estimation using the multiple regression procedure.

In some implementations, the prediction platform may perform pseudoinversion network prediction over a set of identity matrices representing parameters of the first matrix corresponding to single parameters of the second matrix.

In some implementations, the prediction platform may perform natural language processing on the set of semantic descriptions to generate the semantic embeddings matrix.

In some implementations, the action is a response action associated with a role assessment relating to tasks and attributes. In some implementations, the response action is at least one of an automated training enrollment action, an automated training scheduling action, an automated role reassignment action, an automated job application action, an automated job posting action, or an automated job searching and reporting action.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
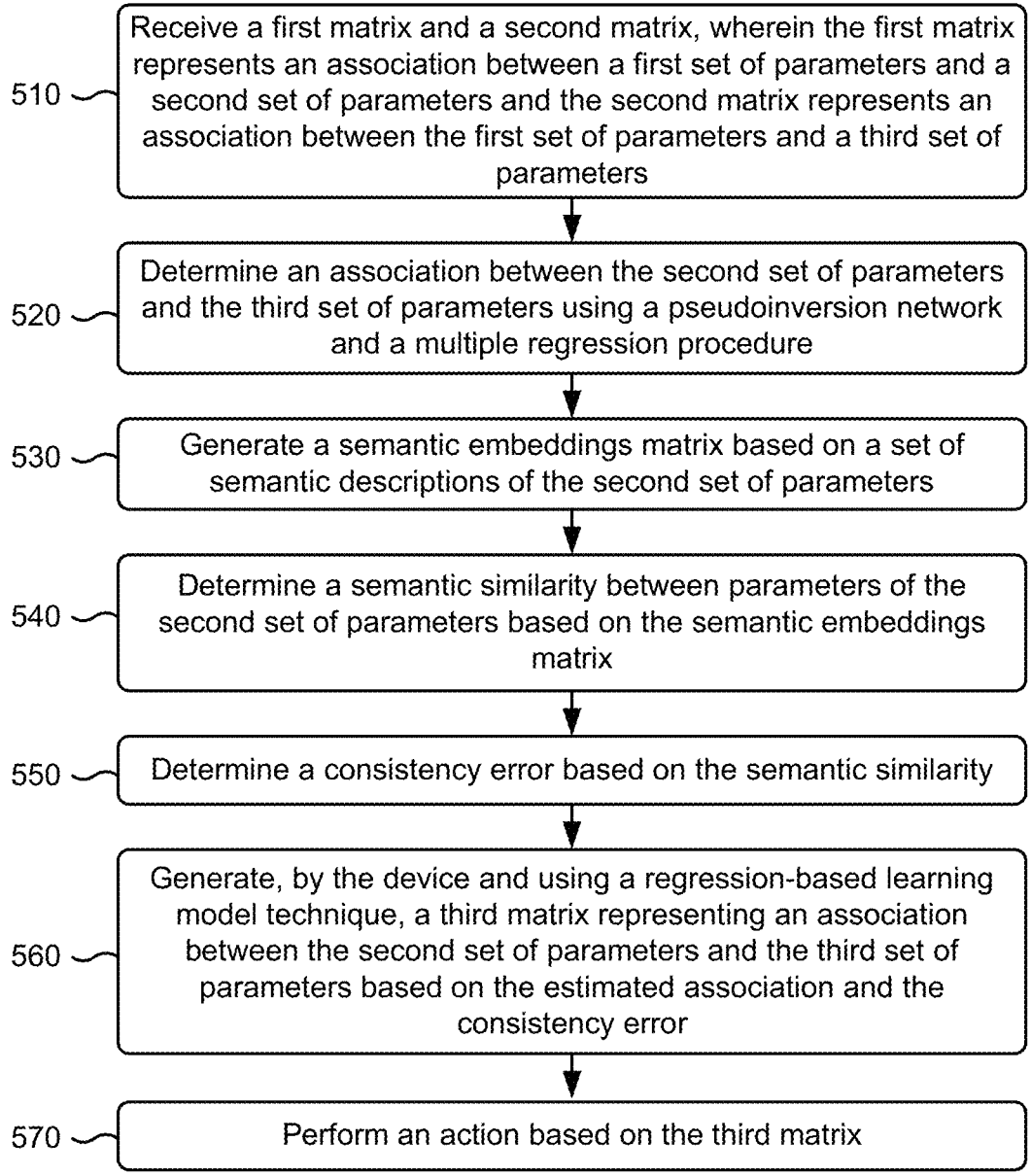
FIG. 5 is a flow chart of an example process for relationship mapping.

FIG. 5 is a flow chart of an example process 500 for relationship mapping. In some implementations, one or more process blocks of FIG. 5 may be performed by a prediction platform (e.g. prediction platform 220). In some implementations, one or more process blocks of FIG. 5 may be performed by another device or a group of devices separate from or including prediction platform (e.g. prediction platform 220), such as a user device (e.g. user device 210) and a computing resource (e.g. computing resource 224).

As shown in FIG. 5, process 500 may include receiving a first matrix and a second matrix wherein the first matrix represents an association between a first set of parameters and a second set of parameters and the second matrix represents an association between the first set of parameters and a third set of parameters (block 510). For example, the prediction platform (e.g., using processor 320, memory 330, storage component 340, input component 350, output component 360, communication interface 370 and/or the like) may receive a first matrix and a second matrix and wherein the first matrix represents an association between a first set of parameters and a second set of parameters and the second matrix represents an association between the first set of parameters and a third set of parameters, as described above. In some implementations, the first matrix represents an association between a first set of parameters and a second set of parameters and the second matrix represents an association between the first set of parameters and a third set of parameters.

As further shown in FIG. 5, process 500 may include determining an association between the second set of parameters and the third set of parameters using a pseudoinversion network and a multiple regression procedure (block 520). For example, the prediction platform (e.g., using processor 320, memory 330, storage component 340, input component 350, output component 360, communication interface 370 and/or the like) may determine an estimated association between the second set of parameters and the third set of parameters using a pseudoinversion network and a multiple regression procedure, as described above.

As further shown in FIG. 5, process 500 may include generating a semantic embeddings matrix based on a set of semantic descriptions of the second set of parameters (block 530). For example, the prediction platform (e.g., using processor 320, memory 330, storage component 340, input component 350, output component 360, communication interface 370 and/or the like) may generate a semantic embeddings matrix based on a set of semantic descriptions of the second set of parameters, as described above.

As further shown in FIG. 5, process 500 may include determining a semantic similarity between parameters of the second set of parameters based on the semantic embeddings matrix (block 540). For example, the prediction platform (e.g., using processor 320, memory 330, storage component 340, input component 350, output component 360, communication interface 370 and/or the like) may determine a semantic similarity between parameters of the second set of parameters based on the semantic embeddings matrix, as described above.

As further shown in FIG. 5, process 500 may include determining a consistency error based on the semantic similarity (block 550). For example, the prediction platform (e.g., using processor 320, memory 330, storage component 340, input component 350, output component 360, communication interface 370 and/or the like) may determine a consistency error based on the semantic similarity, as described above.

As further shown in FIG. 5, process 500 may include generating, using a regression-based learning model technique, a third matrix representing an association between the second set of parameters and the third set of parameters based on the estimated association and the consistency error (block 560). For example, the prediction platform (e.g., using processor 320, memory 330, storage component 340, input component 350, output component 360, communication interface 370 and/or the like) may generate, using a regression-based learning model technique, a third matrix representing an association between the second set of parameters and the third set of parameters based on the estimated association and the consistency error, as described above.

As further shown in FIG. 5, process 500 may include performing an action based on the third matrix (block 570). For example, the prediction platform (e.g., using processor 320, memory 330, storage component 340, input component 350, output component 360, communication interface 370 and/or the like) may perform an action based on the third matrix, as described above.

Process 500 may include additional implementations, such as any single implementation or any combination of implementations described below and/or in connection with one or more other processes described elsewhere herein.

In some implementations, the first set of parameters is a set of workforce roles, the second set of parameters is a set of workforce tasks, and the third set of parameters is a set of workforce attributes.

In some implementations, the prediction platform may set the first matrix as an input layer; set the second matrix as an output layer; and set the third matrix as a set of internal parameters and an internal structure for estimation using the multiple regression procedure.

In some implementations, the prediction platform may perform pseudoinversion network prediction over a set of identity matrices representing parameters of the first matrix corresponding to single parameters of the second matrix.

In some implementations, the prediction platform may perform natural language processing on the set of semantic descriptions to generate the semantic embeddings matrix.

In some implementations, the action is a response action associated with a role assessment relating to tasks and attributes. In some implementations, the response action is at least one of an automated training enrollment action, an automated training scheduling action, an automated role reassignment action, an automated job application action, an automated job posting action, or an automated job searching and reporting action.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for relationship mapping. In some implementations, one or more process blocks of FIG. 6 may be performed by a prediction platform (e.g. prediction platform 220). In some implementations, one or more process blocks of FIG. 6 may be performed by another device or a group of devices separate from or including prediction platform (e.g. prediction platform 220), such as a user device (e.g. user device 210) and a computing resource (e.g. computing resource 224).

As shown in FIG. 6, process 600 may include determining an association between a second set of parameters and a third set of parameters using a pseudoinversion network and a multiple regression procedure wherein an association between a first set of parameters and the second set of parameters is defined for the device and an association between the first set of parameters and the third set of parameters is defined for the device (block 610). For example, the prediction platform (e.g., using processor 320, memory 330, storage component 340, input component 350, output component 360, communication interface 370 and/or the like) may determine an estimated association between a second set of parameters and a third set of parameters using a pseudoinversion network and a multiple regression procedure and wherein an association between a first set of parameters and the second set of parameters is defined for the device and an association between the first set of parameters and the third set of parameters is defined for the device, as described above. In some implementations, an association between a first set of parameters and the second set of parameters is defined for the device and an association between the first set of parameters and the third set of parameters is defined for the device.

As further shown in FIG. 6, process 600 may include determining semantic embeddings based on a set of semantic descriptions of the second set of parameters (block 620). For example, the prediction platform (e.g., using processor 320, memory 330, storage component 340, input component 350, output component 360, communication interface 370 and/or the like) may determine semantic embeddings based on a set of semantic descriptions of the second set of parameters, as described above.

As further shown in FIG. 6, process 600 may include determining a semantic similarity between parameters of the second set of parameters based on the semantic embeddings (block 630). For example, the prediction platform (e.g., using processor 320, memory 330, storage component 340, input component 350, output component 360, communication interface 370 and/or the like) may determine a semantic similarity between parameters of the second set of parameters based on the semantic embeddings, as described above.

As further shown in FIG. 6, process 600 may include determining a consistency error based on the semantic similarity (block 640). For example, the prediction platform (e.g., using processor 320, memory 330, storage component 340, input component 350, output component 360, communication interface 370 and/or the like) may determine a consistency error based on the semantic similarity, as described above.

As further shown in FIG. 6, process 600 may include generating, using a regression-based learning model technique, a matrix representing an association between the second set of parameters and the third set of parameters based on the estimated association and the consistency error (block 650). For example, the prediction platform (e.g., using processor 320, memory 330, storage component 340, input component 350, output component 360, communication interface 370 and/or the like) may generate, using a regression-based learning model technique, a matrix representing an association between the second set of parameters and the third set of parameters based on the estimated association and the consistency error, as described above.

As further shown in FIG. 6, process 600 may include performing an action based on the matrix (block 660). For example, the prediction platform (e.g., using processor 320, memory 330, storage component 340, input component 350, output component 360, communication interface 370 and/or the like) may perform an action based on the matrix, as described above.

Process 600 may include additional implementations, such as any single implementation or any combination of implementations described below and/or in connection with one or more other processes described elsewhere herein.

In some implementations, a semantic similarity between parameters of the third set of parameters corresponds to the semantic similarity between the parameters of the second set of parameters.

In some implementations, the prediction platform may divide the parameters of the second set of parameters into a training set and a prediction set based on the consistency error. In some implementations, the prediction platform may generate a regression-based learning model using the regression-based learning model technique and based on the training set and the prediction set. In some implementations the prediction platform may generate the matrix using the regression-based learning model.

In some implementations, the prediction platform may determine the association between parameters of the third set of parameters and the parameters of the second set of parameters, which are included in the prediction set, using the regression-based learning model.

In some implementations, the first set of parameters is a set of workforce roles, the second set of parameters is a set of workforce tasks, and the third set of parameters is a set of workforce attributes.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
 one or more memories; and
 one or more processors, communicatively coupled to the one or more memories, to:
  receive a first matrix and a second matrix,
   wherein the first matrix represents an association between a first set of parameters and a second set of parameters and the second matrix represents an association between the first set of parameters and a third set of parameters;
  estimate an association between the second set of parameters and the third set of parameters using a pseudoinversion network and a multiple regression procedure;
  receive a set of semantic descriptions of the second set of parameters;
  generate a semantic embeddings matrix based on the set of semantic descriptions of the second set of parameters;
  determine a semantic similarity between parameters of the second set of parameters based on the semantic embeddings matrix;
  determine a consistency error based on the semantic similarity;
  generate, using a regression-based learning model technique, a third matrix representing an association between the second set of parameters and the third set of parameters based on the association and the consistency error; and
  perform an action based on the third matrix.

2. The device of claim 1, wherein a semantic similarity between parameters of the third set of parameters corresponds to the semantic similarity between the parameters of the second set of parameters.

3. The device of claim 1, wherein the one or more processors are further to:
 divide the parameters of the second set of parameters into a training set and a prediction set based on the consistency error;
 generate a regression-based learning model using the regression-based learning model technique and based on the training set and the prediction set; and wherein the one or more processors, when generating the third matrix, are to:
  generate the third matrix using the regression-based learning model.

4. The device of claim 3, wherein the one or more processors are further to:
 determine the association between parameters of the third set of parameters and the parameters of the second set of parameters, which are included in the prediction set, using the regression-based learning model.

5. The device of claim 1, wherein the first set of parameters is a set of workforce roles, the second set of parameters is a set of workforce tasks, and the third set of parameters is a set of workforce attributes.

6. The device of claim 1, wherein the one or more processors, when estimating the association between the second set of parameters and the third set of parameters, are configured to:
 set the first matrix as an input layer;
 set the second matrix as an output layer; and
 set the third matrix as a set of internal parameters and an internal structure for estimation using the multiple regression procedure.

7. The device of claim 6, wherein the one or more processors are further to:
 perform pseudoinversion network prediction over a set of identity matrices representing parameters of the first matrix corresponding to single parameters of the second matrix.

8. The device of claim 1, wherein the one or more processors are further configured to:
 perform natural language processing on the set of semantic descriptions to generate the semantic embeddings matrix.

9. The device of claim 1, wherein the action is a response action associated with a role assessment relating to tasks and attributes, and
 wherein the response action is at least one of:
  an automated training enrollment action,
  an automated training scheduling action,
  an automated role reassignment action,
  an automated job application action,
  an automated job posting action, or
  an automated job searching and reporting action.

10. A method, comprising:
 receiving, by a device, a first matrix and a second matrix,
  wherein the first matrix represents an association between a first set of parameters and a second set of parameters and the second matrix represents an association between the first set of parameters and a third set of parameters;
 determining, by the device, an association between the second set of parameters and the third set of parameters using a pseudoinversion network and a multiple regression procedure;
 generating, by the device, a semantic embeddings matrix based on a set of semantic descriptions of the second set of parameters;
 determining, by the device, a semantic similarity between parameters of the second set of parameters based on the semantic embeddings matrix;
 determining, by the device, a consistency error based on the semantic similarity;
 generating, by the device and using a regression-based learning model technique, a third matrix representing an association between the second set of parameters and the third set of parameters based on the association and the consistency error; and performing, by the device, an action based on the third matrix.

11. The method of claim 10, wherein the first set of parameters is a set of workforce roles, the second set of parameters is a set of workforce tasks, and the third set of parameters is a set of workforce attributes.

12. The method of claim 10, wherein determining the association between the second set of parameters and the third set of parameters comprises:

setting the first matrix as an input layer;

setting the second matrix as an output layer; and setting the third matrix as a set of internal parameters and an internal structure for estimation using the multiple regression procedure.

13. The method of claim 10, further comprising:

performing pseudoinversion network prediction over a set of identity matrices representing parameters of the first matrix corresponding to single parameters of the second matrix.

14. The method of claim 10, further comprising performing natural language processing on the set of semantic descriptions to generate the semantic embeddings matrix.

15. The method of claim 10, wherein the action is a response action associated with a role assessment relating to tasks and attributes, and wherein the response action is at least one of:
an automated training enrollment action,
an automated training scheduling action,
an automated role reassignment action,
an automated job application action,
an automated job posting action, or
an automated job searching and reporting action.

16. A non-transitory computer-readable medium storing instructions, the instructions comprising:

one or more instructions that, when executed by one or more processors of a device, cause the one or more processors to:

determine an association between a second set of parameters and a third set of parameters using a pseudoinversion network and a multiple regression procedure, wherein an association between a first set of parameters and the second set of parameters is defined for the device and an association between the first set of parameters and the third set of parameters is defined for the device;

determine semantic embeddings based on a set of semantic descriptions of the second set of parameters;

determine a semantic similarity between parameters of the second set of parameters based on the semantic embeddings;

determine a consistency error based on the semantic similarity;

generate, using a regression-based learning model technique, a matrix representing an association between the second set of parameters and the third set of parameters based on the association and the consistency error; and perform an action based on the matrix.

17. The non-transitory computer-readable medium of claim 16, wherein a semantic similarity between parameters of the third set of parameters corresponds to the semantic similarity between the parameters of the second set of parameters.

18. The non-transitory computer-readable medium of claim 16, wherein the one or more instructions, when executed by the one or more processors, further cause the one or more processors to:

divide the parameters of the second set of parameters into a training set and a prediction set based on the consistency error;

generate a regression-based learning model using the regression-based learning model technique and based on the training set and the prediction set; and wherein the one or more instructions, that cause the one or more processors to generate the matrix, cause the one or more processors to:

generate the matrix using the regression-based learning model.

19. The non-transitory computer-readable medium of claim 18, wherein the one or more instructions, when executed by the one or more processors, further cause the one or more processors to:

determine the association between parameters of the third set of parameters and the parameters of the second set of parameters, which are included in the prediction set, using the regression-based learning model.

20. The non-transitory computer-readable medium of claim 16, wherein the first set of parameters is a set of workforce roles, the second set of parameters is a set of workforce tasks, and the third set of parameters is a set of workforce attributes.

* * * * *